United States Patent [19]

Turpin et al.

[11] Patent Number: 4,608,314

[45] Date of Patent: Aug. 26, 1986

[54] ACRYLIC AND ACRYLIC/EPOXY COPOLYMER COMPOSITIONS AS SELF-CURING CATHODIC ELECTROCOATING VEHICLES

[75] Inventors: Edward T. Turpin, Elyria; David T. Thrane, Fairview Park, both of Ohio

[73] Assignee: SCM Corporation, New York, N.Y.

[21] Appl. No.: 775,865

[22] Filed: Sep. 13, 1985

Related U.S. Application Data

[63] Continuation-in-part of Ser. No. 677,872, Dec. 4, 1984, abandoned.

[51] Int. Cl.$^4$ .................. C08G 18/80; B32B 27/40; A23L 1/00; C25D 13/06
[52] U.S. Cl. .................. 428/425.8; 204/186.7; 427/388.4; 524/813; 524/839; 524/840; 526/301; 528/45; 528/75
[58] Field of Search ............ 524/813, 839, 840; 526/301; 204/181 C; 528/45; 427/388.4; 428/425.8

[56] References Cited

U.S. PATENT DOCUMENTS

| | | | |
|---|---|---|---|
| 2,606,892 | 8/1952 | Kropa et al. | 260/80.3 |
| 2,647,884 | 8/1953 | Wystrach | 260/47 |
| 2,882,260 | 4/1959 | Bartl et al. | 260/77.5 |
| 3,442,843 | 5/1969 | Keberle et al. | 260/29.2 |
| 3,654,336 | 4/1972 | Krimm et al. | 260/453 PH |
| 3,692,746 | 9/1972 | Woo et al. | 526/301 |
| 3,947,338 | 3/1976 | Jerabek et al. | 523/415 |
| 3,984,299 | 10/1976 | Jerabek | 523/415 |
| 4,031,050 | 6/1977 | Jerabek | 523/415 |
| 4,101,491 | 7/1978 | Tucker | 526/301 |
| 4,167,499 | 9/1979 | Hazan | 523/423 |
| 4,264,748 | 4/1981 | Oriel et al. | 525/109 |
| 4,399,256 | 8/1983 | Gimpel et al. | 523/406 |
| 4,429,096 | 1/1984 | Schaefer | 526/301 |

*Primary Examiner*—Herbert S. Cockeram
*Attorney, Agent, or Firm*—A. Joseph Gibbons; Thomas M. Schmitz

[57] ABSTRACT

Package and tank stable, low temperature self-curing, cation-active aqueous soluble or dispersible coating compositions are prepared by copolymerizing blocked meta-isopropenyl-$\alpha,\alpha$-dimethylbenzyl isocyanate (m-TMI) with various vinyl unsaturated monomers optionally in the presence of epoxy-amine adduct. These cation-active polymers when acidified or partially acidified provide aqueous solutions or dispersions especially useful as low temperature curable vehicles in cathodic electrocoating.

13 Claims, No Drawings

ACRYLIC AND ACRYLIC/EPOXY COPOLYMER COMPOSITIONS AS SELF-CURING CATHODIC ELECTROCOATING VEHICLES

This is a continuation-in-part of application Ser. No. 677,872 filed Dec. 4, 1984, and now abandoned, having a common assignee and incorporated herein by reference.

BACKGROUND OF THE INVENTION

The invention relates to improved cathodic electrocoating vehicles containing blocked isocyanate functionality together with other functionality i.e. OH, NH, etc., capable of producing a self-cure in an electrocoating system.

In U.S. Pat. Nos. 3,984,299 and 4,031,050 Jerabek teaches a method of electrocoating wherein the electrodepositable (cathode) composition comprises a blocked polyisocyanate and a hydroxyl-containing adduct being the reaction product of a primary or secondary amine and a polyepoxide wherein the adduct is solubilized with acid to provide cationic groups. Hicks, U.S. Pat. No. 4,225,479 teaches aqueous resinous compositions salted with acid for electrodeposition wherein the composition is the reaction product of a polyepoxide and an amine mixture of $C_{8-18}$ aliphatic monoamine and an aliphatic diamine containing one primary and one tertiary amine group reactive with epoxide groups. In U.S. Pat. No. 3,947,338, Jerabek and Marchetti teach cathodic electrocoating method using a self-curing polyurethane resin derived from the reaction product of an epoxide with a primary or secondary amine and a partially blocked organic polyisocyanate.

More recent systems relate to the copolymerization of various vinyl unsaturated monomers in the presence of epoxy resin adducts. Diefenbach et al, GB No. 3123536, teach an acidified aqueous binder for cathodic electrocoating wherein acrylic or methacrylic esters, hydroxy or amino substituted monomers and other non-functional vinyl monomers are copolymerized by emulsion polymerization in the presence of cationic synthetic resins such as adducts of epoxy resin with amines, poly caprolactone and diketimines. Subsequent mixing of a partially blocked diisocyanate further reacted with an alkane type polyol, i.e. trimethylol propane effects the crosslinking of the deposited coating. Gimpel et al, U.S. Pat. No. 4,399,256 have conducted polymerizations with copolymerizable N-(1-alkenyl)isocyanate, particularly vinyl isocyanate.

It is further known to free radical polymerize isocyanoethyl methacrylate (IEM) in dry solvents with itself or with a variety of acrylic or styrenic monomers without substantial damage to the isocyanate functionality (see Paul E. Cranely, A Latent Crosslinker for Coatings and Adhesive Resins, 27th Annual Technical Conference of the Cleveland Society for Coating Technology, May 15, 1984). Regulski and Thomas (Organic Coatings Applied Polymer Science Proc., 48, pp 1006 (1983)) determined deblocking temperatures for various blocked isocyanatoethyl methacrylates polymerized in the presence of methyl methacrylate and ethyl acrylate. Brixius and Simms, U.S. Pat. No. 4,446,175, teaches coatings based on IEM polymers and copolymers with various monomers using mercaptan chain-transfer agents. Bortnick (U.S. Pat. No. 2,718,516) had earlier described high molecular weight polymers based on (meth)acrylic ester isocyanates having a plurality of isocyanate groups. Oriel et al, U.S. Pat. No. 4,264,748 teach epoxy resin coating compositions cured with IEM/acrylate copolymers prepared from IEM or blocked IEM. Oriel and Flowers, U.S. Pat. No. 4,401,794 teach copolymerization of various, acrylate and vinyl aromatic monomers with isocyanatoalkyl esters of unsaturated carboxylic acid (IEM) under anhydrous conditions to form moisture curable coatings.

Hazan, U.S. Pat. No. 4,167,499 teaches a graft copolymer comprising a monoepoxide portion said to be grafted onto an acrylic-amine backbone having amine or hydroxyl functionality used in conjunction with conventional aminoplast crosslinkers. Sueling and Kuntz, U.S. Pat. No. 3,453,223, teach graft copolymerization of acrylonitrile, blocked polymerizable isocyanates under free radical catalysis in the presence of an aliphatically saturated alcohol having at least two primary or secondary hydroxyl groups. Schafer (U.S. Pat. No. 4,429,096) teaches copolymers prepared from acrylamide and the quaternary salt of para-isopropenyl-$\alpha,\alpha$-dimethylbenzyl isocyanate with diethylaminoalkanols or alkamines.

A major shortcoming of existing commercial cathodic electrocoat resin systems is the high (350°–400° F.) baking temperature required to achieve adequate coating cure and resistance properties. Where a cure temperature of less than 350° F. is possible, there are usually problems such as lack of storage or tank stability.

The present invention relates to improved self-curing amino cation-active aqueous acid dispersible polymer coating compositions based on polymers and copolymers of unsaturated, polymerizable blocked isocyanate monomers, especially metaisopropenyl-$\alpha,\alpha$-dimethylbenzyl isocyanate.

SUMMARY OF THE INVENTION

The present invention relates to new package-stable and tank-stable self-curing cation-active aqueous dispersible coating compositions containing amino, hydroxyl and blocked isocyanate functionality. These are prepared by polymerizing or copolymerizing:

(a) at least 5 weight percent of a polymerizable blocked monoisocyanate having the formula:

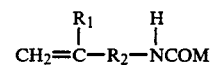

wherein $R_1$ is hydrogen or $C_{1-3}$ lower alkyl group; $R_2$ is a diradical selected from group consisting of phenylene, benzylene or $\alpha,\alpha$-dimethylbenzylene group; and M is an isocyanate blocking agent residue; said blocked monoisocyanate being polymerized alone or copolymerized with (b) 30 to 95 weight percent polymerizable comonomer comprising at least one member of the group consisting of acrylate and methacrylate esters, styrene, vinyl chloride, vinylidene chloride and vinyl acetate and wherein said acrylate or methacrylate esters are selected from alkyl, hydroxyalkyl, alkylaminoalkyl and dialkylaminoalkyl esters; wherein the weight percentage of (a) and (b) total 100; and wherein said polymerization is optionally carried out in the presence of (c) 60 to 300 weight percent of an amine-epoxy adduct comprising the reaction product of an epoxide and an organic amine having at least one primary or secondary amino group reactive with said epoxide; said percent (c) based on total weight of (a) and (b) monomer;

said polymer or copolymer having an ionizable amino nitrogen, derived either from monomer (b), amino-epoxy adduct (c) or a combination thereof, sufficient to disperse or dissolve said polymer in an aqueous medium on acidification or partial acidification;

A further aspect relates to the use of new cationic-vehicles for coating various substrates, particularly useful in the cathodic electrocoating of metals and the resulting coated product.

DETAILED DESCRIPTION OF THE INVENTION

The instant amino cation-active aqueous cathodic electrocoatings are acidified or partially acidified compositions derived by polymerization of various vinyl monomers including amino and hydroxy containing monomers with various polymerizable organic monoisocyanates, optionally in the presence of various epoxy-amine adducts. The amino cation-activity of the instant polymer composition can be derived either from the vinyl monomer or from the epoxy-amine adducts which on acidification provide water soluble or dispersible compositions useful in the cathodic electrocoating of metals including aluminum, iron, and other substrates.

Useful polymerizable blocked monoisocyanates (a) include a variety of aryl or aralkyl isocyanates having vinyl unsaturation capable of participating in free radical induced copolymerization with other vinyl monomers or oligomers. These include, for example, vinyl benzyl isocyanates, isopropenyl benzyl isocyanates, vinyl aryl isocyanates such as vinyl phenyl and isopropenyl phenyl isocyanates and the like. Isopropenyl phenyl isocyanates and isopropenyl benzyl isocyanates can be prepared by known methods including U.S. Pat. Nos. 3,654,336; 4,379,767; 4,399,074; 4,399,073; and 4,439,616. The most preferred monomer is meta-isopropenyl α,α-dimethylbenzyl isocyanate wherein the isocyanate functionality is fully blocked with common blocking agents. In general the blocked isocyanate polymerizable monomer will have the structure

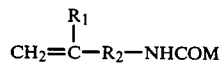

wherein $R_1$ is hydrogen or $C_{1-3}$ lower alkyl; $R_2$ is the difunctional radical selected from the group phenylene, benzylene and α,α-di-substitutedbenzylene; and M represents a blocking agent residue. Suitable blocking agents are those known in the art including alcohols, phenols, ketoximes, and the like. Especially preferred blocking agents are caprolactam and 2-ethylhexyl alcohol or mixtures thereof. The general method of preparation is to add the isocyanate to the blocking agent with or without a catalyst, such as an organo-tin compound, over a period of time sufficient to control the exotherm, at a temperature high enough to achieve a reasonable blocking rate but low enough to prevent polymerization through the double bond or the reverse deblocking reaction. This temperature is normally 50°–120° C., depending on the particular isocyanate/blocking agent combination and the catalyst in use. Normally, a 0 to 10% excess of blocking agent is used; reaction is complete when free NCO content is essentially zero, as determined by either infra-red absorption spectroscopy or titration with standard n-butylamine solution.

The copolymerizable vinyl monomers (B) usefor for copolymerization with the polymerizable blocked monoisocyanate (A) to form the acrylic or acrylic-/epoxy nitrogen containing cationic resin include various monomers, such as styrene, vinyl toluene, (meth)acrylate esters, amino-bearing monomers such as dimethylaminoethyl (meth)-acrylate or hydroxyl-bearing monomer such as hydroxyethyl acrylate. Vinyl halides, vinyl acetate, and vinylidene halides are also useful copolymerization monomers. The copolymerizable vinyl monomers (B) are used in the instant invention in amounts of from 0 to about 95 weight percent basis total combined weight of A and B, preferably from about 40 to 85 percent and most advantageously from 45 to 60 weight percent. The vinyl monomer is copolymerizable with the blocked isocyanate monomer and the copolymerization can be done with or without the amine-adduct component (C).

The vinyl monomer (B) component usually comprises several different monomers which serve different purposes in the finished polymer. For example, the alkyl (meth)acrylate esters contribute to the polymer chain; the alkylaminoalkyl (meth)acrylate esters provide the amino functionality from which the amino cation-activity is derived by subsequent full or partial acidification. It is understood that similar cation-activity can be derived totally or in part by the epoxide/amine adduct (C) when the polymerization is conducted in the presence of (C) component. The hydroxyl-bearing vinyl monomer, i.e. hydroxyalkyl (meth)acrylates is useful in providing active hydrogen moiety, usually as a side chain off the main polymer chain, which contributes to the crosslinking activity for cure with the latent isocyanate groups. This functionality (OH) can be provided with (C) components

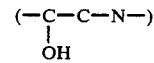

or alternatively the —OH functionality can be provided by glycol compounds added during the polymerization step or later. All three aspects and combinations are considered to be part of this invention. It will be appreciated that the amount of hydroxyl-bearing monomer depends in part on the reactive hydroxyl content of the epoxy resin. All of the hydroxyl-bearing functionality may be derived from either vinyl monomer or the aminated epoxy resin. When the hydroxyl functionality is derived from both monomer and animated epoxy resin the content from each source may be varied widely.

Referring next to the amine-epoxy adduct (c), such adducts are well known in the coatings art. These products are formed by reacting an organic polyepoxide having epoxy equivalents per mole greater than one and preferably about two, with an amine. The epoxides are exemplified in U.S. Pat. No. 4,294,741 column 3, line 26 through column 4, line 13. Useful amine-epoxy adducts are incorporated herein by reference to the following patents: U.S. Pat. No. 3,984,299 where such adduct, contrary to the instant invention is used as the dominant or only resin vehicle; U.S. Pat. No. 3,367,991; U.S. Pat. No. 3,321,548; U.S. Pat. No. 2,887,458; U.S. Pat. No. 4,066,525; and U.S. Pat. No. 4,119,599. Preferred amines useful in preparing the amine-epoxy adduct include amine having hydroxy functionality which can participate in the crosslinking reaction with the deblocked isocyanate functionality in the cure step. Such amines include the alkanolamines such as diethanolamine, ethanolamine, and in some cases triethanolamine. Such primary alcohols are quite reactive with isocyanates and contribute to the polymer crosslinkability more prominently than do the secondary alcoholic functionality produced in the formation of the amine adduct.

Although the amine epoxide adducts are preferred, other non-amine adducts can be used, as for example, when the amino cation portion is derived from the amino contacting acrylates. Such compounds include polyepoxides reacted with polyhydric compounds, polycarboxylic acids and epoxides chain extended with polyols and cyclic polyols.

Aqueous coatings of the above type may be applied either by conventional coating techniques or by electrodeposition. For cathodic electrodeposition it is necessary to neutralize or partially neutralize the amine portion of the polymer. Thus by neutralizing the amino-resins desirable aqueous compositions can be obtained by electrodeposition from solutions or dispersions of pH between 3 and 10. This can be accomplished by acidification of all or part of the amino group functionality by an inorganic acid or an organic acid such as for example formic, acetic, or lactic acid and the like. In determining the degree of neutralization for a particular system, an amount of neutralizing acid is selected to solubilize or disperse the resin. Phosphoric acid is the preferred inorganic acid and lactic acid is a preferred organic acid for the acidification or partial acidification to form the amino cation active polymer compositions.

Usually the cathodic resin composition will be present in water at concentrations from about 1 percent to about 30 percent by weight of resin although more concentrated aqueous compositions may be prepared for storage and shipping. Preferred useful concentrations are from 5 to 15 weight percent. The unpigmented compositions may be electrocoated to deposit clear aqueous coatings on the cathode electrode. More commonly these compositions will be used in combination with various pigment compositions and other additives known to the electrocoating art. Conventional pigment containing compositions include organic and inorganic pigments and additives such as titanium dioxide, oxides, carbon black, talc, barium sulfate as well as pigments or pseudo pigments known as plastic pigments such as polystyrene particles and the like.

In the electrocoating process the aqueous cathodic bath containing the neutralized cationic resin, pigments, additives etc., is placed in contact with an electrically conductive anode and an electrically conductive cathode serving as the article to be coated. Current is applied (usually D.C.) at voltages between 50 and 500 volts whereby the organic resin migrates and is deposited on the metal substrate to be coated such as for example, steel, aluminum, iron and the like. Other bath components such as pigments, filler and additives are conveyed with the cathodically charged resin and deposited on the substrate. After deposition the coating substrate is removed from the bath and rinsed with deionized water prior to effecting a cure. The deposited coatings cure at elevated temperatures by the usual techniques of heating in ovens or with infrared heaters. While the prior art curing temperatures usually range from about 350° F. to about 425° F., an improved aspect of the instant invention allows cure temperatures in the range of from 250° F.–350° F. to provide metal coated products having excellent corrosion and detergent resistance.

Various other acrylic backbone or epoxy/acrylic backbone nitrogen-containing cation resins may be prepared by substituting different monomers or by modifying the type and amount of the epoxy/amine adducts present during the polymerization.

The following examples are meant to illustrate the invention without implying any limitation therein. Unless otherwise defined parts and percentages are expressed as weight percentages and temperatures are given as degrees Centigrade.

Preparation of Blocked Isocyanates

EXAMPLE 1

Blocked Meta-Isopropenyl $\alpha,\alpha$-dimethylbenzyl Isocyanate 452 grams meta-isopropenyl $\alpha,\alpha$-dimethylbenzyl isocyanate (m-TMI) was added to 279 grams (10% excess) caprolactam plus 0.68 grams dibutyltin dilaurate (DBTDL) catalyst under agitation at 90° C. over a period of 1 hour, and held for a further 4 hours, at which point the free NCO content, by n-butylamine titration, had dropped to 0.35%. This NCO content corresponds to a conversion of 97.3%. The product was a crystalline solid, with MP=60°–62° C. in the crude state and MP=62°–64° C. after crystallization and drying from petroleum ether.

EXAMPLE 2

Preparation of Aminated Epoxy Resin

| | Weight Parts |
|---|---|
| DER 333 (low mol. wt. epoxy resin from Dow Chemical Co., WPE = 200) | 1355 |
| Bisphenol A | 460 |
| Nonyl Phenol | 153.4 |
| Ethylene glycol mono-butyl ether (EGMBE) | 1013 |
| Di-ethanolamine | 219 |

DER 333, bisphenol A and nonyl phenol were charged into a 5 liter flask, and upheated slowly to 140° C., at which point the exothermic reaction (with cooling) carried the temperature to 170° C. The reaction was held at 170° C. to a constant viscosity as measured on the ICI cone and plate viscometer. The constants at this stage were: Viscosity at 125° C.=43.8 poise; WPE (wt. per epoxide equivalent)=940. The EGMBE solvent was added, the batch cooled to 120° C. and the diethanolamine added all at once, with cooling to hold 120° C. This reaction was given 2 hours at 120° C. and assumed complete. Final constants were:
Non-volatile  67.8% by wt.
Base number (NV)  54 mg. KOH per gm
Viscosity at 25° C.  412 poise

EXAMPLE 3

Pure Acrylic Resin

| Formula | Weight Parts |
|---|---|
| 1. M-TMI/CPL adduct of Example 1 | 293 gms. |
| 2. Methyl methacrylate | 367 gms. |
| 3. Ethyl acrylate | 563 gms. |
| 4. 2-hydroxyethyl acrylate | 110 gms. |
| 5. Dimethylaminoethyl methacrylate | 184 gms. |
| 6. Vazo 64 (Dupont) | 43 gms. (+8) |

-continued

| Formula | Weight Parts |
| --- | --- |
| 7. Ethylene glycol mono-hexyl ether | 507 gms. |

Items 1–6 were premixed as follows: Item 1 was dissolved in items 2–5 with warming to 50° C. The solution was cooled to 30° C. and then item 6 was stirred in till dissolved. The monomer feed premix was then added to item 7 in a 3 liter vessel equipped with stirrer, thermometer, reflux condenser, inert gas inlet and dropping funnel. The feed period was 2 hours at 85° C. The batch was held for 1 hour, at which point a further 8 gms. of the initiator Vazo 64 was added, followed by a further 2 hour hold. Final constants were as follows:

Non-volatile content (determined) 70.0%
Corrected NV (counting caprolactam as non-volatile) 75.6%
Base No. (of non-volatile) 41.5 mg. KOH/gm.
Viscosity (60% in EGMBE—25° C.) 188 poise

EXAMPLE 4

Acrylic/Styrene Resin

| Formula | Weight Parts |
| --- | --- |
| 1. m-TMI/CPL adduct of Example 1 | 293 gms. |
| 2. Styrene | 367 gms. |
| 3. Ethyl acrylate | 563 gms. |
| 4. 2-hydroxyethyl acrylate | 110 gms. |
| 5. Dimethylaminoethyl methacrylate | 184 gms. |
| 6. Vazo 64 (Dupont) | 43 gms. |
| 7. Ethylene glycol mono-hexyl ether | 507 gms. |

This resin was processed in similar fashion to Example 3. Final Constants were:

Non-volatile (determined) 69.4%
Corrected NV 74.3%
Base No. (of non-volatile) 41.5 mg. KOH per gm.
Viscosity (60% in EGMBE—25° C.) 112 poise

EXAMPLE 5

Acrylic Copolymerized with Epoxy-Amine Adduct

| Formula | Weight Parts |
| --- | --- |
| 1. m-TMI/CPL adduct of Example 1 | 226.3 |
| 2. Styrene | 40 |
| 3. Ethyl Acrylate | 69.7 |
| 4. Dimethylaminoethyl methacrylate | 40 |
| 5. Vazo 64 | 24 (+8) |
| 6. EGMBE | 215 |
| 7. Aminated Epoxy of Example 2 | 885 |

This epoxy/acrylic copolymer resin was prepared by exactly the same process as Example 3 except that in this case the epoxy resin served as the "heel" for the acrylic polymerization instead of solvent. Also total hold time was 4 hours and a "chaser" of 8 parts of Vazo 64 was necessary to complete the conversion. Final constants were:

Non-volatile (determined) 58.9%
Corrected NV 64.2%
Base No. (on NV) 46.3 mg. KOH/gm.
Viscosity (60% in EGMBE at 25° C.) 114 poise

EXAMPLE 6

Acrylic Copolymerized with Amine Epoxy Adduct

| Formula | Weight Parts |
| --- | --- |
| 1. m-TMI/CPL adduct of Example 1 | 325.9 |
| 2. Styrene | 38.5 |
| 3. Ethyl acrylate | 120 |
| 4. DMAEMA | 79.6 |
| 5. Vazo 64 | 36 (+5) |
| 6. EGMBE | 315 |
| 7. Aminated Epoxy of Example 2 | 885 |

The monomer mix items 1 to 6, was prepared exactly as for Example 3. This was added, under agitation at 85C, to item 7 over a period of 2 hours. The non-volatile at this point was 54.3%. Adding 5 parts of Vazo 64 and holding temperature for a 1 hour period, brought the non-volatile content to 58.6%. Final corrected NV and viscosity were respectively 65.7% and 74 poise at 60% NV in EGMBE.

EXAMPLE 7

This example demonstrates a special advantage of the present invention, using caprolactam-blocked m-TMI as the blocked isocyanate, in which both fast cure and excellent shelf stability are obtained. This unexpected result is attributed to the high degree of steric strain around the bond facilitating cleavage (deblocking) to the free isocyanate at temperatures above 120° C., and at the same time providing a high degree of steric resistance to hydrolysis and/or reaction with alcoholic species at ambient (less than 30° C.) temperatures.

| Formula | Weight Parts |
| --- | --- |
| 1. m-TMI/CPL adduct of Example 1 | 239.2 |
| 2. Styrene | 300 |
| 3. Ethyl acrylate | 460 |
| 4. Hydroxyethyl acrylate | 90 |
| 5. DMAEMA | 150 |
| 6. Vazo 64 | 35 |
| 7. EGMBE | 425 |

Premixed items 1 to 6 were added to item 7 under agitation over a period of 2 hours at 85° C., followed by a 2 hour hold. Corrected, determined non-volatile content was 73.8%. The following were added to convert the base resin into a clear feed composition:

| | | |
| --- | --- | --- |
| 8. Lactic acid (88%) | | 25 |
| 9. Deionized water | | 127 |
| 10. EGMBE | | 273 |

The batch was held at 50° C. for 16 days, checking viscosity every few days. Cure was determined at 3 bake temperatures for 20 minutes, on films applied by draw-down from the base resin solution on cold-rolled steel panels (before addition of items 8–10). The results are shown in Table 1.

The 61% increase in viscosity in 16 days at 50° C. is considered excellent stability and the MEK resistances at 300° and 325° F. are very good when compared to a conventional acrylic/urethane system of the caprolactam-blocked isophorone diisocyanate type.

TABLE 1

| Time in Days at 50° C. | Viscosity (poise) | Bake Temp. 300° F. | 325° F. | 350° F. |
|---|---|---|---|---|
| 0 | 64 | | | |
| 5 | 79 | | | |
| 9 | 87 | | | |
| 12 | 92 | | | |
| 16 | 103 | | | |
| MEK double rubs (cure) | | 70 | 90 | 130 |

EXAMPLE 8

Grey Electrocoating Composition

| | Weight Parts |
|---|---|
| Clear Feed | |
| 1. Resin of Example 3 | 174 |
| 2. Aminated epoxy of Example 2 | 23.6 |
| 3. Organo-phosphate resin[a] | 19.4 |
| 4. 2-ethyl hexanol | 15.4 |
| 5. Propylene glycol mono-methyl ether (PGMME) | 15.4 |
| 6. Lactic acid (88%) | 1.8 |
| 7. Deionized water | 15.4 |
| Mix items 1 to 7 | |
| Tank | |
| 8. Lactic acid (88%) | 3.8 |
| 9. Deionized water | 982 |
| Add Clear Feed to Tank | |
| Pigment Feed Concentrate | |
| 10. Resin of Example 3 | 12.22 |
| 11. Lactic acid (88%) | 1.46 |
| 12. DI water | 37.36 |
| 13. Hydrous aluminum silicate clay | 3.53 |
| 14. Rutile titanium dioxide | 12.34 |
| 15. Amorphous Silica | 1.76 |
| 16. Carbon black | .06 |
| 17. Quinacridone pigment | .014 |
| 18. Deionized water | 8.23 |
| Sandmilled to a 7-8 Hegman grind fineness. Added to tank. | |

[a]Epoxy phosphate: Acid No. 110; NV 62%.

EXAMPLE 9

A grey electrocoat composition was prepared similar to Example 8 with the exception that the resin of Example 4 was substituted for that of Example 3.

EXAMPLE 10

A grey electrocoat composition was formulated as follows:

| | Weight Parts |
|---|---|
| Clear Feed | |
| 1. Resin of Example 5 | 129.1 |
| 2. PGMME | 8.3 |
| 3. 2-Ethyl hexanol | 8.3 |
| 4. Lactic acid (88%) | 1.0 |
| 5. DI water | 8.3 |
| Mix items 1 to 5 | |
| Tank | |
| 6. Lactic acid (88%) | 5.4 |
| 7. DI water | 1056 |
| Add Clear Feed to Tank | |
| Pigment Feed | |
| 8. Pigment Dispersion vehicle[a] | 12.96 |
| 9. Lactic acid (88%) | 2.06 |
| 10. Surfynol 104[b] | 0.42 |
| 11. Titanium dioxide | 22.1 |
| 12. Carbon black | 0.42 |
| 13. Clay | 5.63 |
| 14. Fumed Silica | 1.56 |
| 15. DI water | 27.52 |
| Added to Tank. | |

[a]Reaction product of diethylaminopropylamine, a bisphenol A epoxy resin and a C-16 olefin epoxide.
[b]An acetylenic glycol type defoamer.

EXAMPLE 11

A grey electrocoating composition was prepared using the procedure of Example 10 except that the copolymer resin of Example 6 was used in place of the resin of Example 5.

TABLE 2

| | | Application Details(1) | | | |
|---|---|---|---|---|---|
| Paint | Resin | Type(2) | Tank NV | DFT(3) | Voltage |
| Ex 8 | Ex. 3 | A | 8.8 | 0.8 | 50–100 |
| Ex 9 | Ex. 4 | A/S | 8.8 | 0.8 | 50–100 |
| Ex 10 | Ex. 5 | A/S/EAA | 9.4 | 0.6 | 100–125 |
| Ex 11 | Ex. 6 | A/S/EAA | 9.4 | 0.6 | 150–175 |

(1)Substrate - 24 gauge zinc-phosphated chromate-rinsed steel panels.
(2)Resin type A = acrylic; A/S = acrylic styrene; A/S/EAA = acrylic styrene copolymerized with epoxy-amine adduct.
(3)Dry film thickness, in mils, after cure.

TABLE 3

| | | Cured Film Properties | | | | | |
|---|---|---|---|---|---|---|---|
| Paint | Type(1) | Bake Temp F. | S/S(2) | Det.(3) | Impact Dir. | Rev. | Pencil Hardness | MEK rubs(4) |
| Ex 8 | Blend | 300 | 240 | | 80 | 20 | 2H | 200 |
| | | 350 | 336 | | 80 | 20 | 2H | 200+ |
| Ex 9 | Blend | 300 | 432 | | 40 | | 2H | 60 |
| | | 350 | 432 | | 80 | | 2H | 90 |
| Ex 10 | Copolymer | 300 | 500+ | | 20 | | 4H | 200+ |
| | | 350 | 500+ | | 40 | | 4H | 200+ |
| Ex 11 | Copolymer | 340 | 500+ | 408 | 40 | | 4H | 200+ |
| | | 380 | 500+ | 408 | 40 | | 4H | 200+ |

(1)Blend indicates epoxy-amine added to paint formulation; copolymer indicates epoxy-amine present during acrylic polymerization.
(2)5% salt-spray resistance, hours to failure.
(3)Detergent resistance - hours to failure. Modified ASTM method D2248-73.
(4)Methyl ethyl ketone soaked rag, number double rubs to metal exposure.

What is claimed is:

1. A self-curable amino cation-active aqueous acid-dispersible polymer composition containing amino, hydroxyl and blocked isocyanate functionality derived from the polymerization of:

(a) at least 5 weight percent of a polymerizable blocked monoisocyanate having the formula:

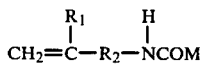

wherein $R_1$ is hydrogen or $C_{1-3}$ lower alkyl group; $R_2$ is a diradical selected from the group consisting of phenylene, benzylene or α,α-dimethylbenzylene group; and M is an isocyanate blocking agent residue; said blocked monoisocyanate being copolymerized with (b) 30 to 95 weight percent polymerizable vinyl comonomer comprising at least one member of the group consisting of acrylate and methacrylate esters, styrene, vinyl chloride, vinylidene chloride and vinyl acetate and wherein said acrylate or methacrylate esters are selected from alkyl, hydroxyalkyl, alkylaminoalkyl and dialkylaminoalkyl esters, wherein the weight percentages are based on the combined weights of A and B monomers and total 100 percent; and wherein said polymerization is optionally carried out in the presence of (c) 60 to 300 weight percent of an amine-epoxy adduct comprising the reaction product of an epoxide and an organic amine having at least one primary or secondary group reactive with said epoxide; said percent (c) being based on total weights of (a) and (b) monomers; wherein the amine cation-activity is derived from monomer (b), amine-epoxy adduct (c) or combinations thereof sufficient to provide an amino-cation activity of from about 35 to 175 milliequivalents per 100 gram resin solids and to effect polymer solubilization or dispersion on partial or full acidification.

2. The composition of claim 1 wherein the monoisocyanate is meta-isopropenyl-α,α-dimethylbenzyl isocyanate blocked with caprolactam, and vinyl comonomer (b) is present at 40–85 weight percent.

3. The composition of claim 2 wherein amino-cation activity is derived solely from ionizable amino-containing acrylic or methacrylic ester monomers.

4. The composition of claim 3 wherein the amino-containing ester is dimethylaminoethyl methacrylate.

5. The composition of claim 2 wherein the amine-epoxy adduct is the reaction product of diglycidyl bisphenol A resin and a primary or secondary amine and has a molecular weight from about 600 to about 4000 and wherein said adduct supplies at least 10% of the amino-cation activity of the self-curable composition.

6. A paint comprising the composition of claim 5.

7. The process of coating a substrate which comprises
(a) providing a self-curing blocked-isocyanate polymer prepared by polymerizing at least 5 weight percent blocked meta-isopropenyl-α,α-dimethylbenzyl isocyanate polymerized alone or copolymerized with one or more vinyl unsaturated copolymerizable comonomers selected from the group consisting of styrene; and alkyl, hydroxyalkyl, aminoalkyl, alkylaminoalkyl or dialkylaminoalkyl acrylate or methacrylate esters; wherein said polymerization or copolymerization is optionally conducted in the presence of 60 to 300 weight percent of an amine-epoxy adduct, based on the total weight of the blocked isocyanate and vinyl monomers, said polymer having an amino nitrogen content sufficient to disperse or dissolve the polymer in water on acidification or partial acidification;

(b) applying said polymer as an acidified aqueous solution or dispersion to a substrate;

(c) curing the coated substrate.

8. The process of claim 7 wherein the copolymer is derived from styrene, hydroxyethyl acrylate, ethyl acrylate and dimethylaminoethyl methacrylate and the amine-epoxy adduct is present at 100–300 weight percent basis total monomer.

9. The process of claim 8 wherein the amine-epoxy adduct is the reaction product of a diglycidyl bisphenol A ether or ether resin and a primary or secondary amine, said product having a molecular weight from about 600 to about 4000 and wherein said adduct supplies at least 10% of the amino-cation activity of the self-curable composition.

10. The process of claim 7 wherein the self-curing polymer is formed from the monomers blocked meta-isopropenyl-α,α-dimethylbenzyl isocyanate copolymerized with methyl methacrylate, ethyl acrylate, dimethylaminoethyl methacrylate and 2-hydroxyethyl acrylate.

11. The process of claim 10 wherein the total amino content available for amino cation-activity is from about 35 to about 175 milliequivalents per 100 gram resin solids.

12. A method of electrocoating an electrically conductive surface serving as a cathode which comprises passing an electric current between said cathode and an anode in contact with an aqueous electrodepositable composition, wherein said composition comprises the acid/solubilized, or dispersed self-curable composition of claim 1.

13. A metal substrate coated by the process of claim 9.

* * * * *